United States Patent
Van Den Berg et al.

(10) Patent No.: US 9,820,468 B2
(45) Date of Patent: Nov. 21, 2017

(54) PRE-TREATMENT TEAT CUP

(75) Inventors: Karel Van Den Berg, Bleskensgraaf (NL); Paulus Jacobus Maria Van Adrichem, Delfgauw (NL)

(73) Assignee: LELY PATENT N.V., Maassluis (NL)

( * ) Notice: Subject to any disclaimer, the term of this patent is extended or adjusted under 35 U.S.C. 154(b) by 1290 days.

(21) Appl. No.: 13/400,751

(22) Filed: Feb. 21, 2012

(65) Prior Publication Data
US 2012/0145083 A1 Jun. 14, 2012

Related U.S. Application Data

(63) Continuation of application No. PCT/NL2010/000121, filed on Aug. 9, 2010.

(30) Foreign Application Priority Data

Aug. 31, 2009 (NL) .................... 1037240

(51) Int. Cl.
*A01J 7/04* (2006.01)
*A01J 5/017* (2006.01)
*A01J 5/08* (2006.01)

(52) U.S. Cl.
CPC ............. *A01J 7/04* (2013.01); *A01J 5/017* (2013.01); *A01J 5/08* (2013.01)

(58) Field of Classification Search
CPC .... A01J 7/04; A01J 7/025; A01J 5/003; A01J 5/0175; A01K 13/001
USPC ............... 119/14.1, 14.11, 14.18, 14.08, 119/14.47–14.53
See application file for complete search history.

(56) References Cited

U.S. PATENT DOCUMENTS

| | | | | |
|---|---|---|---|---|
| 2,629,124 A | * | 2/1953 | Merritt | A45D 29/007 132/73 |
| 4,305,346 A | * | 12/1981 | Sparr, Sr. | A61D 11/00 119/670 |
| 5,211,132 A | * | 5/1993 | Farina | A01J 7/04 119/664 |
| 5,235,937 A | * | 8/1993 | Farina | A01J 7/04 119/14.01 |
| 6,269,512 B1 | * | 8/2001 | Thomson | A46B 9/02 15/104.92 |

(Continued)

FOREIGN PATENT DOCUMENTS

| | | |
|---|---|---|
| DE | 10036644 A1 | 2/2002 |
| EP | 535756 A2 | 4/1993 |
| EP | 1695616 A2 | 8/2006 |
| NL | 1022394 C | 5/2004 |

OTHER PUBLICATIONS

Search Report of PCT/NL2010/000121 dated Nov. 29, 2010.

*Primary Examiner* — Yvonne Abbott-Lewis
(74) *Attorney, Agent, or Firm* — Hoyng Rokh Monegier LLP; Ramin Amirsehhi; David P. Owen (57) ABSTRACT

The present invention provides a teat treatment device, as well as an automatic milking device, a method and a teat cup therefor. The present invention cleans or otherwise treats a teat by repeatedly placing a teat cup on the teat and removing it therefrom again, wherein the upper side thereof, in particular segments with projections on the inner side, around the teat-receiving opening scrub the teat clean under frictional contact. Nozzles which can spray a jet of liquid on, in particular, the projections in the inactive position, can assist this treatment.

28 Claims, 3 Drawing Sheets

(56) References Cited

U.S. PATENT DOCUMENTS

| | | | | |
|---|---|---|---|---|
| 6,302,058 | B1 * | 10/2001 | Dahl | A01J 7/04 119/14.47 |
| 6,321,682 | B1 * | 11/2001 | Eriksson | A01J 5/007 119/14.08 |
| 6,321,688 | B1 * | 11/2001 | Eriksson | A01J 7/04 119/651 |
| 6,325,021 | B1 * | 12/2001 | Farina | A01J 7/04 119/612 |
| 6,394,038 | B1 * | 5/2002 | Eriksson | A01K 13/002 119/601 |
| 6,591,784 | B1 * | 7/2003 | Eriksson | A01J 7/04 119/14.08 |
| 7,165,510 | B2 * | 1/2007 | Hakes | A61D 1/02 119/652 |
| 7,882,802 | B2 * | 2/2011 | Van Den Berg | A01J 7/04 119/14.02 |
| 8,393,296 | B2 * | 3/2013 | Hofman | A01J 5/0175 119/14.03 |
| 8,402,920 | B2 * | 3/2013 | Dole | A01J 7/04 119/14.18 |
| 8,534,231 | B2 * | 9/2013 | Hakes | A01J 7/04 119/652 |
| 8,622,026 | B1 * | 1/2014 | Dole | A01J 7/025 119/14.18 |
| 9,357,744 | B2 * | 6/2016 | Hofman | A01J 7/022 |
| 2002/0185071 | A1 | 12/2002 | Guo | |

* cited by examiner

PRE-TREATMENT TEAT CUP

CROSS REFERENCE TO RELATED APPLICATIONS

This application is a continuation of PCT application number PCT/NL2010/000121 filed on 9 Aug. 2010, which claims priority from Netherlands application number 1037240 filed on 31 Aug. 2009. Both applications are hereby incorporated by reference in their entireties.

BACKGROUND OF THE INVENTION

1. Field of the Invention

The present invention relates to a teat treatment device, comprising a teat cup and a controllable robot arm with a control device which is designed to attach the teat cup to a teat of a dairy animal, wherein the teat cup comprises a teat-cleaning device which is designed to clean a teat introduced into the teat cup by means of frictional contact.

2. Description of the Related Art

A teat treatment device is known, for example, from U.S. Pat. No. 6,321,682 (DeLaval Holding AB), which describes a teat-receiving means which comprises brush hairs or rotatable brushes. Document WO 94/12019 (British Technology Ltd) describes a teat cup with inflatable teat engagement members and means to enable a relative movement of the teat and element.

A drawback of the known devices is the fact that in practice it appears difficult to provide a combination of a simple and reliable attachment to the teat, thorough cleaning of the teat and a high operational reliability. In particular the reliability of moving or inflatable parts may leave something to be desired.

BRIEF SUMMARY OF THE INVENTION

It is an object of the present invention to provide a simple and reliable teat treatment device.

According to the invention, this object is achieved by a teat treatment device, comprising a teat cup and a controllable robot arm with a control device for attachment to the teat cup to a teat of a dairy animal, wherein the teat cup comprises a teat-cleaning device for cleaning by frictional contact a teat introduced into the teat cup, and wherein the control device controls the robot arm to successively actively and repeatedly attaches and removes the teat cup to and from the teat.

With this invention, the control circuit which the teat cup already needs for attachment and removal is used. Said attachment and removal is usually carried out by a robot arm which is provided for the purpose. As a result of the invention, it is no longer necessary to provide a teat-cleaning device in the teat cup which is actively movable. Due to the absence of the movement means required for the latter, the device as a whole can be more reliable. Furthermore, it is advantageous according to the invention to make the movement so large that the teat leaves the teat cup again and can be re-attached, as in this case a relatively small teat-cleaning device can be used. This in turn ensures that the teat-cleaning device cannot form an obstacle during the attachment of the teat, or at least forms less of an obstacle.

It should be noted that the expression "successively actively and repeatedly remove" firstly means that the teat treatment device removes the teat cup and replaces it or can replace it, i.e. the device does not solely react to the teat cup being kicked off or becoming detached or the like. Secondly, the (ability of) replacement obviously relates to one and the same teat, and not to two teats which are treated successively. Finally, the term "successively" here means that the connection and removal take place during one and the same operation. For example, if the cleaning of a teat is the operation which is being carried out, then the teat cup of the teat-treatment system is placed on the teat several times and removed from the latter again during cleaning of said teat. What is expressly not claimed as meaning "successively" is a device which can place a teat cup on the teat one single time and remove it from the latter, for example during a milking operation, and can replace and remove said cup again during a subsequent milking operation. This situation, which is trivial as such, is not intended to be covered by the term "successively". The main point is the possibility to carry out the placing and removal several times during one and the same treatment. The active removal, in particular, has until now only been used in the prior art to end a treatment, while, in this case, this step forms an integral part of the invention. It should also be noted that, in practice, it is possible to carry out the operation of placing and removing the teat cup on a certain teat only once (or not at all, even), if said teat is then found to have been treated, i.e. for example is found to be sufficiently clean. The invention expressly relates to a device which offers the possibility of carrying out the placement and removal of the teat cup repeatedly in succession and with the same teat. Devices which can only carry out said operation once are excluded from the scope of protection of the present invention.

Further particular embodiments of the invention are described below.

In particular, the control device and the robot arm are designed to carry out a vertical, in particular oscillating movement which extends, at least substantially along an axis of the teat, with a stroke which is larger than the length of the part of the teat which is accommodated in the teat cup. This latter measure ensures a sufficiently large stroke. In addition, such a single movement is the most common way to attach a teat cup, which requires the smallest degree of adjustment to the control circuit.

In embodiments, the teat-cleaning device comprises projections on an inner wall of the teat cup. Such projections are suitable for cleaning an introduced teat by, for example, rubbing dirt off upon displacement of the robot arm. It should be noted that such a teat-cleaning device is logically situated on the inner side of the teat cup, as is the case with other exemplary embodiments to be mentioned below.

In other embodiments, the teat cup has an upper side with a teat-receiving opening, wherein the upper side around the teat-receiving opening comprises a plurality of flexible segments which, together with an introduced teat, can seal the upper side in a substantially air-tight manner. In this embodiment, the segments form a flexible air seal, so that a vacuum can be created in the teat cup by means of the vacuum means provided therefor which can assist the connection to the teat, while they can also clean the teat during attachment and removal due to the frictional contact with the teat surface. In one embodiment, the frictional contact is scrubbing. Due to the complete absence of superfluous moving parts and the fact that, moreover, no teat-cleaning device is provided on the inner wall of the teat cup which could make attachment to the teat more difficult, a very reliable teat treatment device is provided. It should be noted here that it is of course possible to combine the two above-mentioned embodiments in which case both segments and a teat-cleaning device are provided on the inner wall.

Advantageously, the device comprises 4 to 20 segments, more preferably 8 to 16 segments. Such numbers have been found to provide an excellent combination of little leakage air occurring through the gaps and little resistance occurring during attachment.

In particular, the teat-receiving opening has a cross section greater than 10 and smaller than 21 mm. Between these limit values, teats of many different cross sections can be attached, in which case a compromise has been found between sufficiently large frictional and therefore cleaning force on the teat surface and sufficiently large ease of attachment, without a very high vacuum having to be provided in order to still suck the teat through the teat-receiving opening. In particular, the teat-receiving opening has a cross section of approximately 15 mm, this value meaning "between 14 and 16 mm", and more particularly "between 14.5 and 15.5 mm".

In one embodiment, the teat-cleaning device comprises at least one sponge element, advantageously a circular sponge with a hole around the teat-receiving opening. This at least one sponge element may be provided on the inner wall, of course in such a position that the teat can be cleaned by frictional force when moving past it. By providing several sponge elements around a central cavity, the cleaning efficiency can be increased since a larger part of the periphery can be cleaned in one go. In addition, by providing such sponge elements as one unit, that is to say as a circular sponge with a hole, it is possible to use the resilience of the sponge, as the sponge is slightly compressed when the teat is introduced into the teat cup, resulting in the frictional force on the teat, and thus the cleaning force, increasing.

In another embodiment, the teat-cleaning device comprises projections on at least one of the segments. This has the significant advantage that the cleaning action of the segments can be optimized. Normally, the teat is enclosed by the segments when the teat cup is attached, which will yield inwards in this case, due to their resilience. During the subsequent removal, the segments will fold and the teat will then be wiped clean by the inner edge of the segments. By providing projections on the segments in these embodiments, the cleaning action will be improved. Preferably, the projections are situated on the inner side. The advantage thereof is that the projections are then protected against any outside influences.

In a further embodiment, the projections comprises hairs, tufts and/or ridges. Ridges offer the advantage that they can clean a closed periphery around the teat, while in particular hairs and tufts offer the advantage of being able to sustain a greater local load, even up to a point load, on the teat. This makes it possible to remove stubborn dirt more readily. Such projections can be integrally formed with the material of the segments itself or may also, for example, be produced separately and then arranged in or on the segments.

Advantageously, at least one segment comprises a thickening at the teat-receiving opening. This provides increased stiffness on, in particular, the end of the segment, as a result of which the cleaning force to be exerted increases.

In yet another embodiment, the thickening is rounded, with at least one tangent on the rounded segment running through the teat-receiving opening. Such a rounded thickening has the advantage that teats with different cross-sectional dimensions can readily be cleaned, since a segment will bend sideways less far with a thinner teat than with a thick teat, as a result of which the absolute position of the segment will differ when it is being bent. Such differences in position are less relevant with a rounded thickening, since the contact surface will in principle have similar properties in the various positions in each case.

In another embodiment, the thickening has a triangular cross section, which becomes thinner in the direction of the teat-receiving opening. Although this embodiment is slightly more sensitive to variation in teat thickness, it has the advantage that the contact surface will on average be significantly larger than with a rounded thickening. In yet other embodiments, the thickening has a rectangular cross section.

Advantageously, at least some of the projections are arranged on the thickening. Due to the maximum pressing force, the projections will thus be able to provide an optimum cleaning result. It should be noted that with a rounded thickening, the projections can exert a relatively very large local cleaning force on the tangent, but could also wear out more quickly as a result. In particular with a triangular cross section of the thickening, the wear will take place in a much more uniform manner.

In advantageous embodiment, at least some, and preferably all, of the projections are arranged on the thickening in a direction at an angle to the bottom side and towards the centre of the teat cup. In this case, "at an angle" indicates an angle to the axis of the teat cup, said angle being, for example, between 30 and 50° to said axis. In particular, said angle is such that when removing the teat cup from a teat with an average cross section, the projections come to lie approximately at right angles to the teat surface, which will ensure excellent cleaning action.

In an expedient embodiment, the teat treatment device comprises at least one nozzle on the inner side of the teat cup, which is designed to spray a liquid in the direction of, and advantageously onto, the teat-cleaning device. By means of such a nozzle, liquid can be sprayed onto the teat which may facilitate treatment of the teat. The liquid may, for example, be cleaning liquid, in which case this may, if desired, also be sprayed onto the teat. The cleaning liquid may in this case assist with the removal of dirt and/or with the softening thereof. It should be noted that with the device according to the invention the liquid is distributed over the teat, and that this can then also be scrubbed thoroughly. Advantageously, the nozzle sprays in the direction of the segments, more advantageously onto the projections, at least in the inactive position without an introduced teat. These can then expediently distribute the liquid over the teat. In addition, the liquid can be used to clean the projections, at least the segments, for example after treatment of a teat. It should be noted that it is advantageous in that case if the projections are only situated on the inner side, as they can then effectively be sprayed clean. It is also possible to use other liquids in addition to cleaning liquid, such as a medicine or in particular a disinfectant liquid. In particular, the device is designed, in a first cycle or a number of cycles of attaching and removing the teat cup, to apply a first liquid, advantageously cleaning liquid, and, in a subsequent cycle or number of cycles, to apply another liquid, in particular disinfectant liquid. Thus, a cleaned teat can be subjected to a finishing treatment using disinfectant, for example. It should be noted that, in case the treatment comprises cleaning with or without cleaning liquid, the teat treatment device can also be referred to as a teat-cleaning device, in which case the teat-cleaning device in the teat cup can then also be referred to as a teat-cleaning part.

In yet another embodiment, the teat treatment device furthermore comprises a teat-cleanliness sensor device which is operatively coupled to the control device and which is designed to generate a teat-cleanliness signal, wherein the control device is designed to repeatedly attach and remove the teat cup based on the teat-cleanliness signal. Again, at least the option of actively and successively attaching and removing has to be provided, although it is certainly also possible to carry out only a single cycle, based on the measured cleanliness. Of course, it is possible to clean effectively on the basis of the teat-cleanliness signal, as a result of which insufficient or, on the contrary, excessive contact with the teat is prevented.

In particular, the teat-cleanliness sensor comprises a camera with image-processing equipment which is connected thereto and designed to optically assess the teat cleanliness, and/or a liquid-sensor device which is designed to assess the cleanliness of the liquid sprayed out by the nozzle and collected again. These are expedient embodiments of teat-cleanliness sensors, which are already being used as such. For example, a camera can observe the optical appearance of a teat. If the latter has become dirty, for example while an animal has been walking outside in the rain, the image will be different from a clean reference image. Cleaning can then be carried out, for example repeatedly, until the observed image corresponds sufficiently to the clean reference image. The control circuit then has to be designed accordingly. Similarly, a sensor can be used which measures the pollution of the used liquid. If the used and collected liquid is found to be sufficiently clean, cleansing can be stopped. To this end, an electric conductivity sensor may be provided, for example.

In another embodiment, the device according to the invention comprises a plurality of such teat cups. This makes it possible to treat several teats simultaneously. Alternatively, a teat cup is used to treat more than one teat, which takes more time, but requires fewer parts.

In particular, at least one of the teat cups is designed for milking the teat accommodated therein. Such a device has the advantage that a teat can be treated comprehensively and can subsequently also be milked, which may result in a time saving and improved hygiene.

In particular, the treatment also comprises stimulating the flow of milk and/or premilking, since the tactile stimulation resulting from the movement of the teat cup can effectively initiate the flow of milk, while the teat cup can also readily be configured as a premilking cup, with the required measures obviously largely corresponding to those for milking.

The device can also comprise at least one additional teat cup which is designed for milking the teat. This has the specific advantage that dirt and cleaning liquid cannot come into contact with consumption milk. If the teat cup itself is also configured as a premilking cup and the additional teat cup is designed (exclusively) for the milking phase(s) after premilking, the premilk will not come into contact with the consumption milk either. Thus, in principle there are two completely separate circuits: the one or more teat cups according to the treatment device of the invention suck up dirt and any premilk from the teat and discharge these, while the additional teat cup(s) suck up the consumption milk.

The invention also provides an automatic milking device, comprising a teat treatment device according to the invention. The milking device thus provides a very reliable treatment, in particular cleaning, of teats. Furthermore, it also provides all of the above-described advantages.

In particular, the automatic milking device is arranged on an autonomous self-steering vehicle. Particulars of such an autonomous milking vehicle can be found in, for example, EP1695616 or PCT/NL2007/000190, which are hereby incorporated by reference in their entireties. It should be noted that it is also possible to provide only a teat treatment device according to the invention on the autonomous self-steering vehicle, that is to say without a specific milking device.

The invention furthermore provides a method for cleaning a teat by means of a teat treatment device according to the invention, comprising the following steps:
a) placing a teat cup on a teat by means of the robot arm,
b) actively removing the teat cup from the teat, wherein at least at step b) the teat is cleaned by frictional contact with the cleaning device, furthermore comprising
c) at least once repeating steps a) and b) with said teat.

Obviously, the above holds good provided that this sequence is adhered to, as is the case with the above-described devices according to the invention. The advantages described there also apply equally to the method and therefore a description thereof here is omitted as this would be repetitive.

In particular, the method is carried out using a teat treatment device comprising at least one nozzle on the inner side of the teat cup, which is configure to spray a liquid in the direction onto the teat-cleaning device, furthermore comprising spraying liquid onto at least one of the teat and the teat-cleaning device. Advantageously, in this case, the liquid is sprayed onto the cleaning device at least once immediately prior to step a. As a result thereof, the liquid can be distributed over the teat efficiently. In this case, the liquid comprises, for example, a cleaning liquid and/or a disinfectant, in particular, in a first cycle or series of cycles, a cleaning liquid and in a subsequent cycle or series of cycles a disinfectant.

In another embodiment, the latter furthermore comprises assessing the cleanliness of the sprayed-on liquid, and repeating steps a) and b) until a predetermined level of cleanliness is reached. The assessment can be carried out visually by an operator or automatically using a suitable sensor, such as described, for example, with the corresponding device according to the invention.

The invention also relates to a teat cup for use in a device or method according to the invention, wherein the teat cup is designed to clean a teat introduced into the teat cup by means of frictional contact, and has an upper side with a teat-receiving opening, wherein the upper side around the teat-receiving opening comprises a plurality of flexible segments which are able, together with an introduced teat, to seal the upper side in a substantially air-tight manner. The advantages to be achieved have already been described in detail in the description of the device according to the invention, to which reference is made here. Particular embodiments therefore correspond to the advantageous details of said device mentioned there. By way of example, an advantageous teat cup is provided, comprising a teat-cleaning device which comprises projections on an inner wall of the teat cup, in particular on an inner side of a segment.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
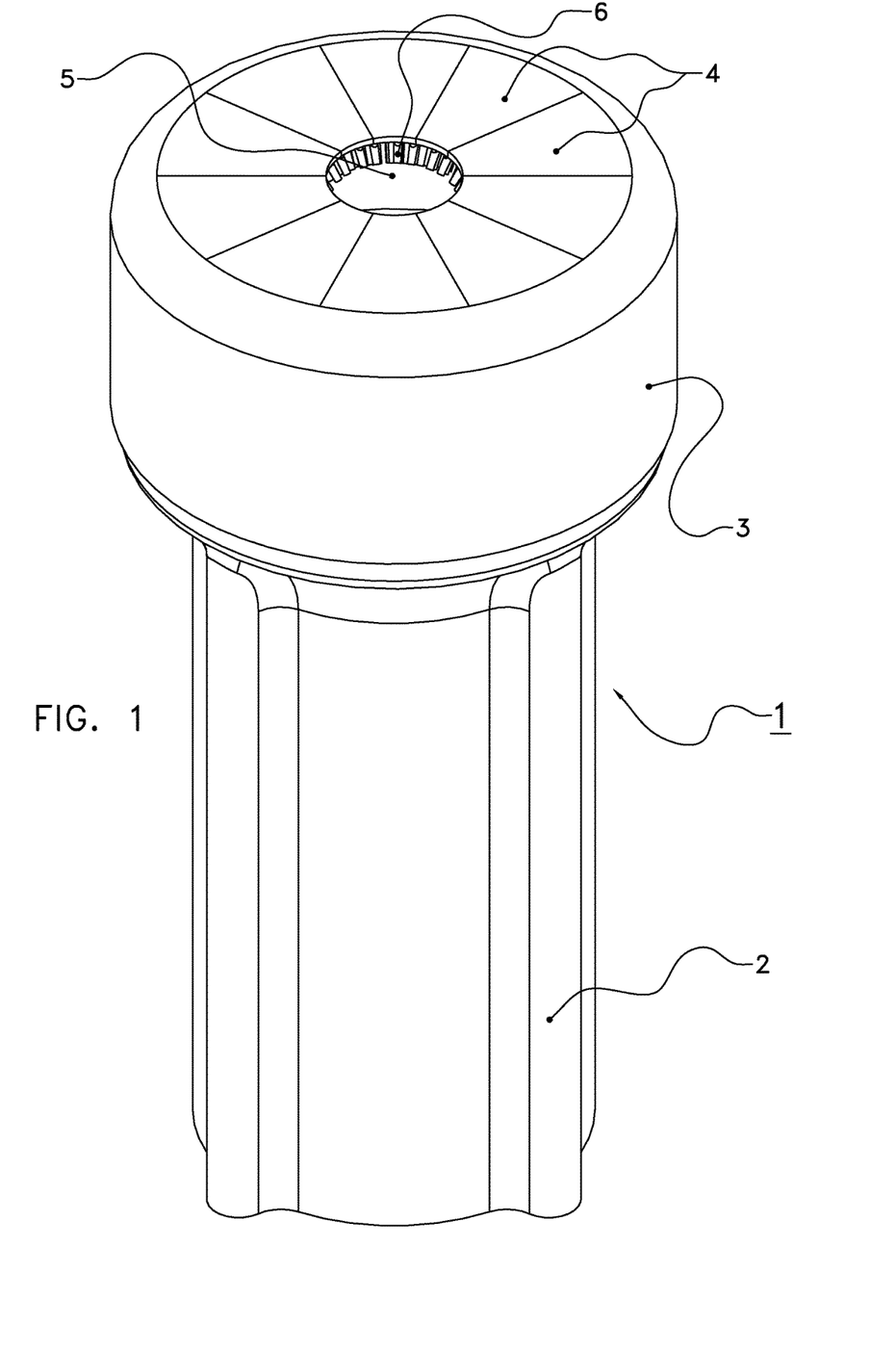
FIG. 1 shows a view in perspective of a teat cup according to the invention.

The following is a description of certain embodiments of the invention, given by way of example only and with reference to the drawings. FIG. 1 shows a view in perspective of a teat cup 1 according to the invention. In this figure, reference numeral 2 denotes the hard cup portion, reference numeral 3 denotes a head part of, for example, a flexible teat guide, although it may also have a different function than a teat guide, and reference numeral 4 denotes segments of the upper side, which are grouped around a teat-receiving opening 5. Some projections 6 can be seen through the latter.

The illustrated teat cup 1 has ten flexible segments 4 which, together with a teat introduced via the teat-receiving opening 5, can seal the interior of the cup in a substantially air-tight manner. By applying a vacuum to the interior, the teat can be introduced in a simple and reliable manner, even if the teat-receiving opening 5 has a cross section which is smaller than the teat cross section, such as for example 15 mm. In this case, the segments can of course yield, but what is important is that they can exert a (frictional) force on the teat, in order to thereby remove dirt and the like from the teat. When the teat cup 1 is then removed from the teat, the segments will bend outwards and will be able to clean the teat further. All this will be explained in more detail with reference to FIG. 2. Incidentally, the remainder of the description virtually only mentions cleaning, but this is intended to also include other teat treatments wherein an inner edge and/or segments of a teat cup are moved over a teat in order to thereby displace dirt or a liquid.

Figure 2:
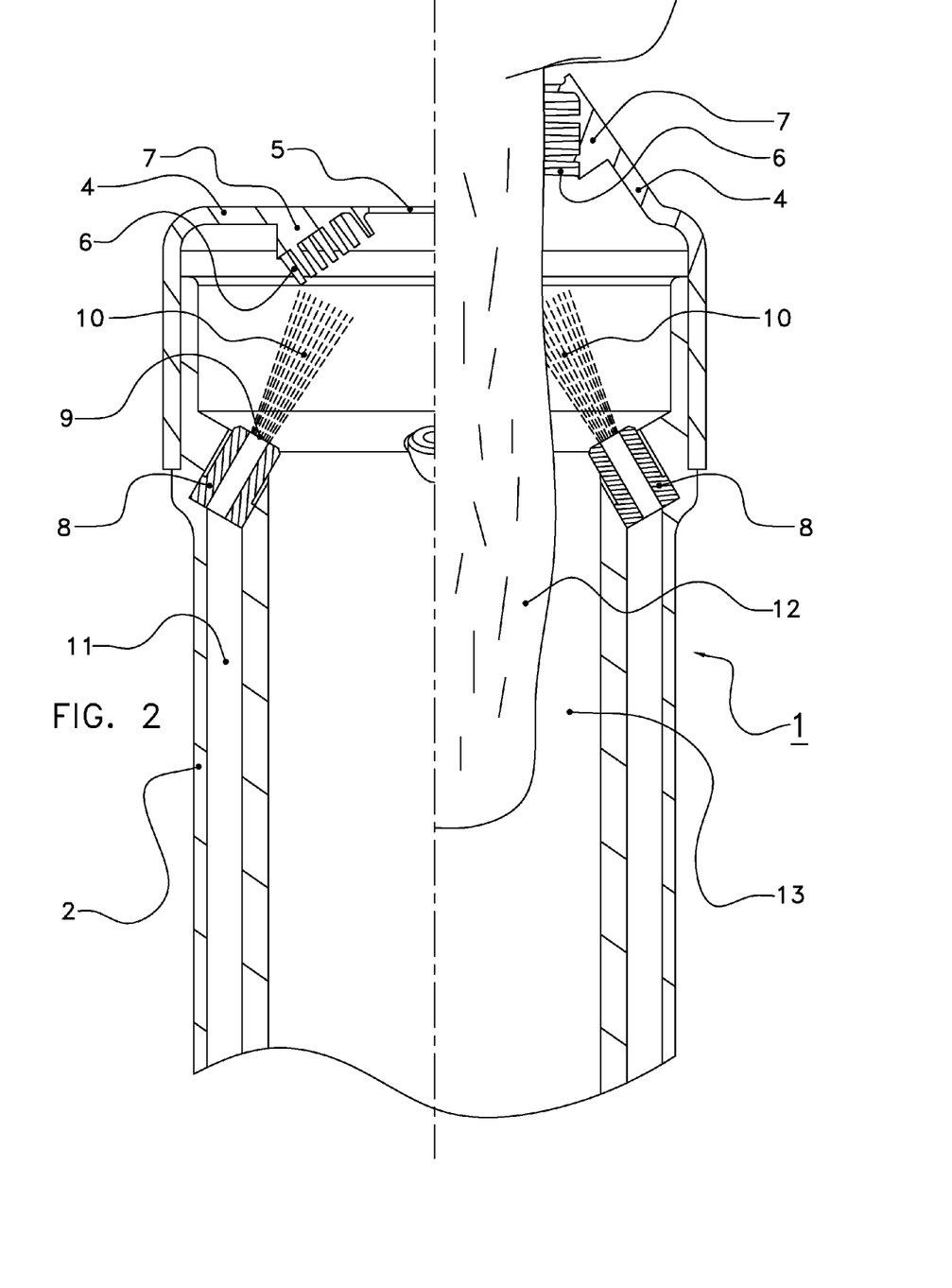
FIG. 2 shows a cross-sectional view of the teat cup from FIG. 1, along I-I, the left-hand side without a teat, the right-hand side with the teat introduced.

FIG. 2 shows a cross-sectional view of the teat cup from FIG. 1, along I-I. In this case, the left-hand side of the Figure shows a teat-cup half without a teat and the right-hand side shows a teat-cup half with an introduced teat which is being removed. Similar parts are denoted by the same reference numerals throughout the drawing.

On the left-hand side of the milking cup 1, a segment can be seen with a segment 4, which is provided with a thickening 7 having a triangular cross section, and on which projections 6 are provided in the form of tufts or short hairs. Advantageously, the segment and the projections are formed as a single part. It should also be noted that the projections project slightly beyond the segment in the teat-receiving opening 5. This contributes to cleaning of the teat during introduction, although the force which is exerted then will generally be slightly less than during removal.

Furthermore, a nozzle 8 with a spray head 9 and a jet 10 of sprayed liquid is shown. The supply to the nozzle 8 is effected, for example, via a supply 11 through either a separate duct or through a hollow wall of the teat cup 1. The spray jet 10 is directed in particular at the projections 6, which can thus be cleaned, and can also distribute the liquid across an introduced teat.

This is clearly shown on the right-hand side, where a teat 12 has been introduced by means of a vacuum in the teat chamber 13. In this case, the segment 4 is bend sideways by the teat 12 during removal, in which case the projections 6 will be substantially straight with respect to the teat and will perform a rubbing or scrubbing action. The thickening 7 can assist this if it is provided with suitable profiling by, on the one hand, providing local additional stiffness, and by a difference in height ensuring optimum positioning of the projections placed thereon with respect to the teat surface.

The jet 10 of liquid which is sprayed through the nozzle 8 onto the projections 6 is in this case distributed over the teat 12. In addition, the nozzle 8 can now also spray onto the teat 12 directly.

What has not been shown here are projections in the form of hairs or the like which have been arranged directly in the side wall and/or the cup portion 2 of the teat cup 1, although these can also lead to good cleaning results. Such projections may be provided in addition or as an alternative. It should be noted that when segments are used, said projections are preferably arranged sufficiently far down, so that a teat does not, either itself or with its segments, hit such projections during attachment, which slightly acts as a barrier. As an alternative or in addition to the projections, a sponge may be provided, which is arranged for example on the segments 4 of the inner wall of the teat cup 1. When a sponge is used, it is also possible to use a very flexible head part, so that a circular sponge which is made from one piece and is arranged thereon is pushed in sufficiently far by the introduced teat to exert a sufficient frictional force thereon.

Figure 3:
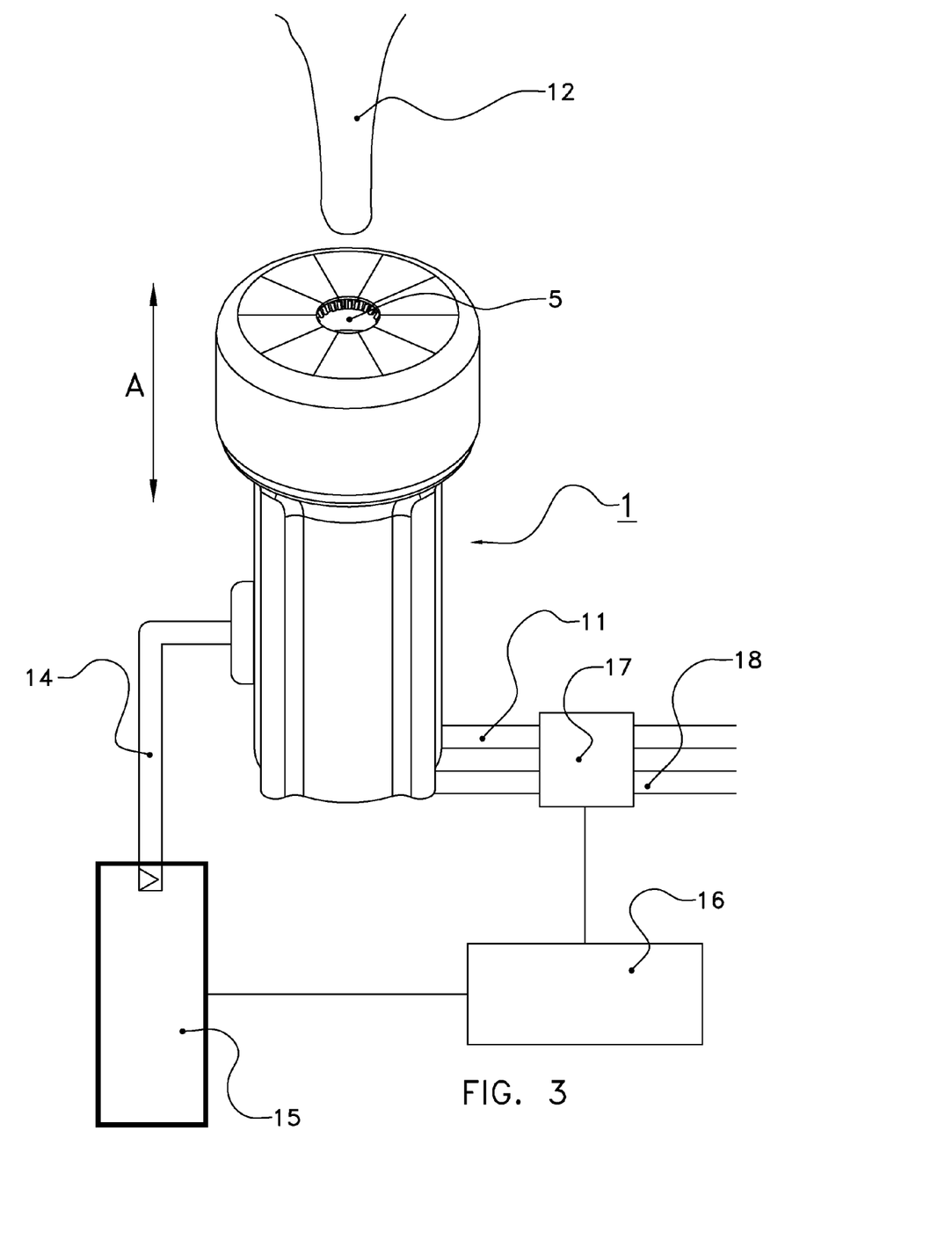
FIG. 3 shows a diagrammatic milking device according to the invention.

FIG. 3 shows a diagrammatic milking device according to the invention. In this figure, reference numeral 14 denotes a gripper which can grasp the teat cup 1 and which is displaced in the direction of arrows A by a robot arm structure 15 by means of a control device 16. The latter is furthermore connected to a teat-cleanliness sensor 17 which measures the liquid supply duct 11 and liquid discharge duct 18.

The gripper 14 serves to move the teat cup 1 in the direction of the double arrow A in order to place it on the teat 12 and also to remove it therefrom again. The gripper can be a movable clamping hand, an electromagnetic gripper etcetera. Here, the robot arm structure 15 is only shown as a telescopic cylinder, although any other robot arm structure is also suitable. The robot arm structure is controlled by the control device 16, it being possible to use other means (not shown) which are, for example, customary for a milking robot, such as a teat-recognition device for positioning, and a vacuum pump for applying a vacuum to the teat chamber in the teat cup 1, or also, for example, a pulsator which can be used to premilk, or even to milk, an introduced teat.

The illustrated supply duct 11 can supply liquid to one or more nozzles. The discharge duct 18 can discharge used liquid and/or (pre)milk from the teat cup 1. The sensor 17 can in this case determine one or more properties of the liquid, in particular in the discharge duct 18, and, if desired, in the supply duct 11, such as conductivity, turbidity and/or colour. If the sensor signal for liquid in the discharge duct 18 or a comparison between the sensor signal for the supply duct 11 and that for discharge duct 18 indicates that the discharged liquid is sufficiently clean, then this is an indication that the teat to be cleaned is also sufficiently clean, at least cannot be cleaned further by the device. Such a decision is taken by the control device 16 which is connected to the sensor 17 and which then takes a suitable action. This may be either ending the cycle of placing the teat cup on the teat and removing it therefrom, with the segments, or at least the upper edge, of the teat cup scrubbing around the teat-receiving opening 5 along the teat 12. It should be noted that, with this method and device, any liquid which is possibly used only performs an assisting function. By contrast, during disinfection, when disinfectant has to be applied, the use of the nozzle or of a similar liquid-application means is of course essential.

The illustrated sensor 17 for determining the cleanliness of the teat is a liquid sensor. Alternatively, this may, of course, also be a camera or the like, in which case, for example, a picture can be taken of the teat and be compared to a reference image of a clean teat.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A teat treatment device, comprising a teat cup and control device with a controllable robot arm for attachment of the teat cup to a teat of a dairy animal, wherein the teat cup comprises a teat-cleaning device for cleaning by frictional contact a teat introduced into the teat cup, and wherein the control device controls the robot arm to successively actively and repeatedly attaches and removes the teat cup to and from the teat during one and the same treatment, wherein the teat cup has an upper side with a teat-receiving opening, wherein the upper side around the teat-receiving opening comprises a plurality of flexible segments which, together with an introduced teat, can seal the upper side in a substantially air-tight manner.

2. The teat treatment device according to claim 1, wherein the control device and the robot arm carry out a vertical oscillating movement extending at least substantially along an axis of the teat, with a stroke which is larger than the length of the part of the teat which is accommodated in the teat cup.

3. The teat treatment device according to claim 1, wherein the teat-cleaning device comprises projections on an inner wall of the teat cup.

4. The teat treatment device according to claim 1, wherein there are 4 to 20 flexible segments.

5. The teat treatment device according to claim 1, wherein the teat-receiving opening has a cross section greater than 10 mm and smaller than 21 mm.

6. The teat treatment device according to claim 1, wherein the teat-cleaning device comprises at least one sponge element.

7. The teat treatment device according to claim 6, wherein the sponge element comprises a circular sponge with a hole around the teat-receiving opening.

8. The teat treatment device according to claim 1, wherein the teat-cleaning device comprises projections on at least one of the segments.

9. The teat treatment device according to claim 8, wherein the projections are on an inner side of the segments.

10. The teat treatment device according claim 9, wherein the teat-cleaning device further comprises projections on at least one of the segments, and wherein at least some of the projections are on a thickening at the teat-receiving opening of the at least one segment.

11. The teat treatment device according to claim 8, wherein the projections comprise at least one of: hairs, tufts, and ridges.

12. The teat treatment device according to claim 1, wherein at least one segment comprises a thickening at the teat-receiving opening.

13. The teat treatment device according to claim 12, wherein the thickening is rounded, with at least one tangent on the rounded segment running through the teat-receiving opening.

14. The teat treatment device according to claim 13, wherein at least some of the projections are on the thickening in a direction at an angle to the bottom side and towards the centre of the teat cup.

15. The teat treatment device according to claim 12, wherein the thickening has a triangular cross section and becomes thinner in the direction of the teat-receiving opening, or wherein the thickening has a rectangular cross section.

16. The teat treatment device according to claim 1, comprising at least one nozzle on the inner side of the teat cup, which is configured to spray a liquid in the direction onto the teat-cleaning device.

17. The teat treatment device according to claim 16, further comprising a teat-cleanliness sensor device operatively coupled to the control device and configured to generate a teat-cleanliness signal, wherein the control device is configured to repeatedly attach and remove the teat cup based on the teat-cleanliness signal.

18. The teat treatment device according to claim 17, wherein the teat-cleanliness sensor comprises at least one of: a camera with image-processing equipment which is connected thereto and configured to optically assess the teat cleanliness, and a liquid-sensor configured to assess the cleanliness of the liquid sprayed out by the nozzle and collected again.

19. The teat treatment device according claim 1, comprising a plurality of such teat cups.

20. The teat treatment device according to claim 19, wherein at least one of the teat cups is configured for milking the teat accommodated therein.

21. The teat treatment device according to claim 1, comprising at least one additional teat cup configured for milking the teat.

22. An automatic milking device, comprising a teat treatment device, wherein the teat treatment device comprises:
   a teat cup and a control device with a controllable robot arm for attachment to the teat cup to a teat of a dairy animal, wherein the teat cup comprises a teat-cleaning device for cleaning by frictional contact a teat introduced into the teat cup, and
   wherein the control device controls the robot arm to successively actively and repeatedly attaches and removes the teat cup to and from the teat during one and the same treatment, wherein the teat cup has an upper side with a teat-receiving opening, wherein the upper side around the teat-receiving opening comprises a plurality of flexible segments which, together with an introduced teat, can seal the upper side in a substantially air-tight manner.

23. The automatic milking device according to claim 22, wherein the automatic milking device is disposed onto an autonomous self-steering vehicle.

24. A method for cleaning a teat by means of a teat treatment device, the method comprising the steps of:
   (a) placing a teat cup on a teat via a robot arm controlled by a control device of the teat treatment device,
   (b) actively removing the teat cup from the teat via the robot arm, wherein at least at step (b) the teat is cleaned by frictional contact with a cleaning device of the teat treatment device,
   (c) at least once repeating steps (a) and (b) with said teat during one and the same treatment wherein the teat cup has an upper side with a teat-receiving opening, wherein the upper side around the teat-receiving opening comprises a plurality of flexible segments which, together with an introduced teat, can seal the upper side in a substantially air-tight manner.

25. The method according to claim 24, further comprising the step of:

spraying liquid onto at least one of the teat and the teat-cleaning device.

26. The method according to claim 24, wherein the liquid is sprayed onto the cleaning device at least once immediately prior to step (a).

27. The method according to claim 24, further comprising the step of:

assessing cleanliness of the sprayed-on liquid, and repeating steps (a) and (b) until a predetermined level of cleanliness is reached.

28. The method according to claim 24, wherein the liquid comprises at least one of: a cleaning liquid and a disinfectant.

* * * * *